United States Patent [19]

Bareket et al.

[11] Patent Number: 4,480,916
[45] Date of Patent: Nov. 6, 1984

[54] PHASE-MODULATED POLARIZING INTERFEROMETER

[75] Inventors: Noah Bareket, San Jose; Wayne W. Metheny, Fremont, both of Calif.

[73] Assignee: The United States of America as represented by the Secretary of the Navy, Washington, D.C.

[21] Appl. No.: 395,769

[22] Filed: Jul. 6, 1982

[51] Int. Cl.$^3$ ............................................. G01B 9/02
[52] U.S. Cl. ..................................... 356/351; 356/360
[58] Field of Search ............... 356/349, 351, 359, 360; 328/133, 135

[56] References Cited

U.S. PATENT DOCUMENTS

| | | | |
|---|---|---|---|
| 3,043,182 | 7/1962 | Saunders | 356/360 |
| 3,767,307 | 10/1973 | Bowker | 356/349 |
| 3,823,604 | 7/1974 | Burch et al. | 356/348 X |
| 4,188,122 | 2/1980 | Massie et al. | 356/349 |
| 4,353,650 | 10/1982 | Sommargren | 356/351 X |

OTHER PUBLICATIONS

Drain et al., "Displacement and Vibration Measurements by Laser Interferometry", *Proc. SPIE*, vol. 136, pp. 52–57, 1977.

*Primary Examiner*—Davis L. Willis
*Assistant Examiner*—Matthew W. Koren
*Attorney, Agent, or Firm*—R. F. Beers; J. M. St. Amand; T. M. Phillips

[57] ABSTRACT

An interferometer for measuring optical surfaces which is capable of very high sensitivity. A HeNe laser light is converted into a circular polarized beam, spatially filtered and collimated. The light beam is passed through a photoelastic modulator for modulating the relative phase of the two polarization states of the optical field of the beam. The beam is then passed through a ROCHON prism which splits the beam into two orthogonally polarized components. One beam is reflected off the optical surface that is being measured and is recombined with the undeviated beam. The resulting irradiance distribution oscillates in the modulation frequency and the phase of the oscillation is dependent upon the optical path difference between the two beams. The detected interference signal is processed to extract the phase information.

3 Claims, 7 Drawing Figures

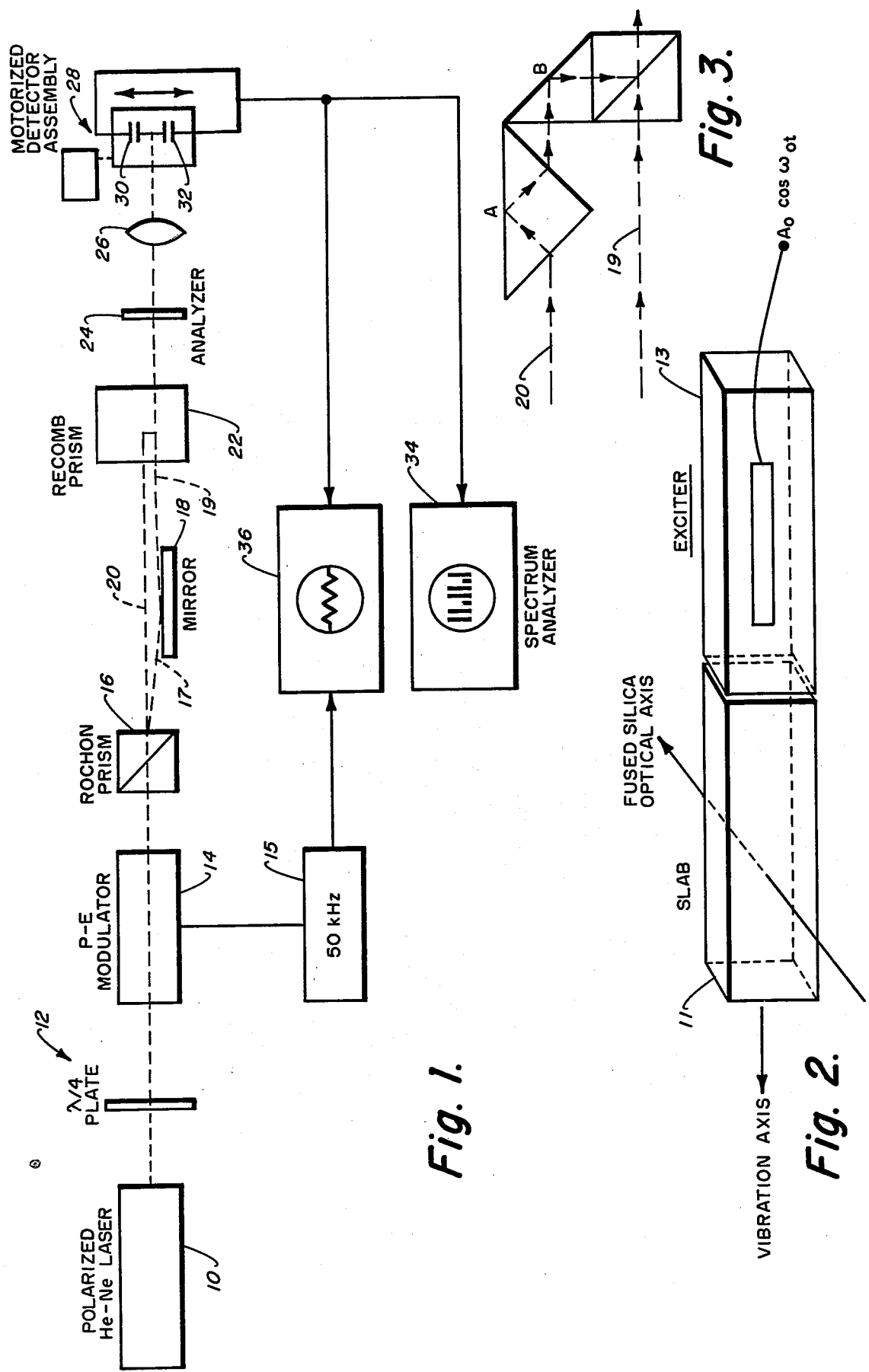

PHASE-MODULATED POLARIZING INTERFEROMETER

BACKGROUND OF THE INVENTION

The present invention relates to interferometers and more particularly to interferometers of the phase modulation type.

The art of interferometers is well known and is discussed by Massie, et al. in U.S. Pat. No. 4,188,122. However, none of the prior known devices and systems use the present method to obtain a high sensitivity capability.

SUMMARY OF THE INVENTION

The present invention provides for apparatus and method using an interferometric technique for measuring optical surfaces which is capable of very high sensitivity. This method is particularly suitable for testing optical surfaces at grazing incidence. Grazing-incidence interferometry can be used to test large optical flats without imaging optics. Since the light of the interferometer strikes the surface at grazing angles, the test is inherently less sensitive than a normal incidence test. To compensate for this reduced sensitivity the interferometer should have intrinsically high sensitivity and low noise. The interferometer embodying the present invention is not limited to grazing incidence tests and is applicable to other tests of optical surfaces which may require high sensitivity.

The principle involved in the present invention is modulating the relative phase of the two polarization states of the optical field of a beam of circularly polarized radiation. The modulated optical beam is divided into two orthogonally polarized beams; one beam is reflected from the optical surface (signal beam) and the other is transmitted unpreturbed ("reference beam"). The beams are then recombined and passed through an analyzer. The irradiance distribution oscillates in the modulation frequency and the phase of the oscillation is dependent upon the optical path difference between the two beams. A lens images the interference pattern on a detector assembly.

Several novel means are provided for processing the detected signal to extract the information. One means employs lock-in amplifiers to find the amplitudes of the fundamental and first harmonic components of the signal. In another means, a delay circuit introduces a phase of 180° between the two parts of the divided signal. The signals are added and subtracted in two channels with the ratio between the outputs to provide the tangent of the phase difference angle. A third means of processing the detector signal is by introducing a phase compensator in the optical train, before the polarizing prism. The compensator introduces a calibrated amount of optical phase between the beams. The interferometer works as a null-detector and the phase is determined by reading the position of the compensator. The compensator can be a polarizer or a waveplate, or combination of the two.

Accordingly, an object of the invention is to provide a means for measuring optical surfaces which is capable of very high sensitivity.

Another object of the invention is to provide a new and improved interferometric method and system for obtaining a representation of the surface contour of an optical surface.

Still another object of the invention is the provision of an improved interferometric method and system for obtaining a representation of the surface contour of an optical surface by modulating the relative phase of the two polarization states of the optical fields of an optical beam by means of a photoelastic modulator.

Other objects, advantages and novel features of the invention will become apparent from the following detailed description of the invention when considered in conjunction with the accompanying drawings wherein:

FIG. 1 is an overall block diagram of an embodiment of the invention.

FIG. 2 is a diagram of a photoelastic modulator used in the embodiment of FIG. 1.

FIG. 3 shows in detail the recombination prism used in the embodiment of FIG. 1.

DETAILED DESCRIPTION OF THE INVENTION

Figure 4:
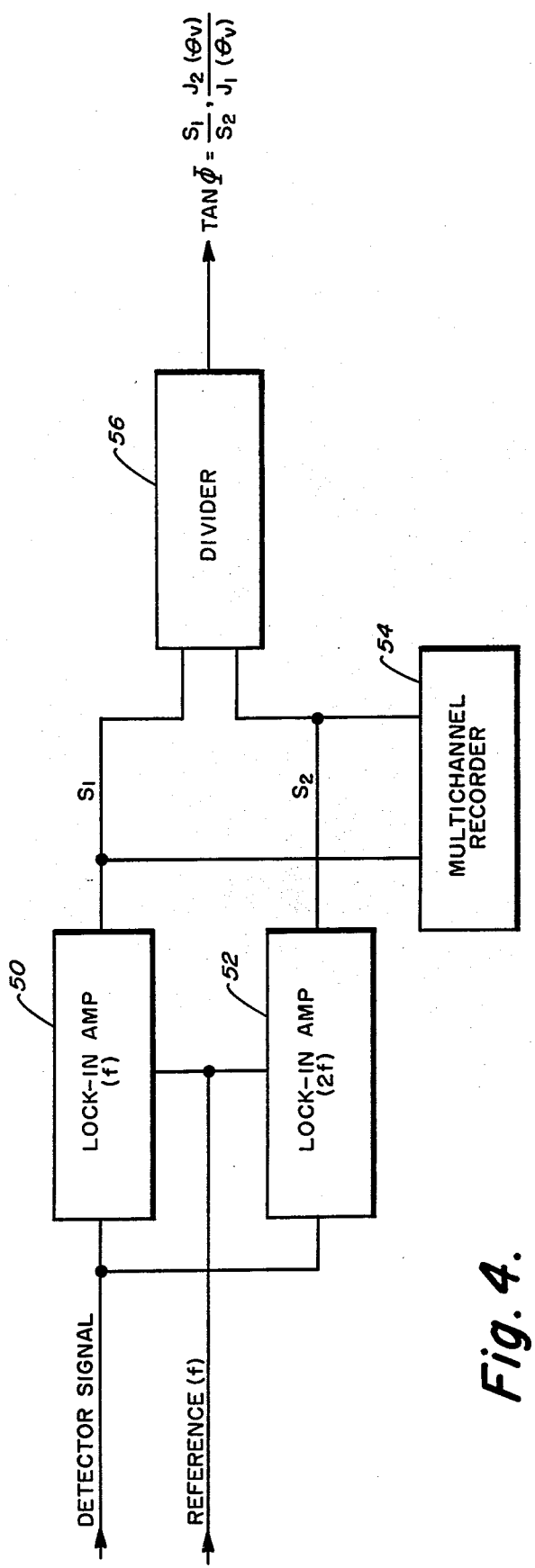
FIG. 4 is a block diagram of an electronic signal processing circuit employing lock-in amplifiers to obtain the optical phase ($\Phi$) from the detector output signal of FIG. 1.

A helium neon laser light that has been converted into a circular polarized beam to maximize the fringe contrast is spatially filtered and collimated into a beam measuring about 5 mm in diameter. The beam passes through photoelastic modulator (PEM) 14 and then through a Rochon prism 16. Photoelastic modulator 14 is shown in FIG. 2 as having a slab 11 vibrated by exciter 13 which is driven by the 50 kHz modulation source 15. Prism 16 splits the beam into two orthogonally polarized components, one component being deviated by an angle of 5°. The deviated beam 17 is incident on the test mirror 18 at a grazing angle of 2.5°. The reflected beam 19 is parallel to the optical axis, as defined by the undeviated beam 20. The length of mirror 18 which is covered by the grazing beam 17 is given by $l = d/\sin\theta$, where d is the beam diameter and $\theta$ is the grazing angle. In the example provided, l is about 115 mm (75% of the mirror diameter).

The two beams 19 and 20 are recombined by means of prism assembly 22. As shown in FIG. 3, prism assembly 22 first inverts the parallel beam, using a dove prism A, then superimposes them at a beamsplitter B. The inversion is important in order to avoid shearing by wavefront reversal.

After recombination, the beams pass through polarizer 24 oriented at 45° to the polarization axes of both beams. The resulting irradiance distribution oscillates in the modulation frequency and the phase of the oscillation is dependent upon the optical path difference between the two beams. Lens 26 is used to image the center of the test mirror 18 on to the detector plane of motorized detector assembly 28, consisting of two detectors, 30 and 32, 20 mm apart. Detectors 30 and 32 are low-noise high-gain silicon avalanche photodiodes with integrated pre-amplifiers. The detector assembly is mechanically moved to scan the interference plane.

The detected interference intensity is fed to spectrum analyzer 34 and oscilliscope 36.

The signal obtained by each detector can be described as:

$$I(t) = I_1(t) + I_2(t) + 2\sqrt{I_1(t)I_2(t)} \cos[\theta_o \cos(\omega_o t) + \Phi_x(t)] \quad (1)$$

The variables of the equation are

I(t)—the relative output of the detector, proportional to the irradiance on it.

$I_1(t), I_2(t)$—the irradiance of the reference beam and the signal beam, respectively.

$\omega_o$—the modulation frequency $\theta_o$—the modulation depth $\Phi_x(t)$—a phase term proportional to the measured quantity, the optical path difference between the beams. The AC part of the signal can be expressed as follows:

$$S(t) = A \cos[\theta_o \cos \omega_o t + \Phi] = A[\cos(\theta_o \cos \omega_o t) \cos \Phi - \sin(\theta_o \cos \omega_o t) \sin \Phi] \quad (2)$$

$$= A\{\cos \Phi [J_o(\theta_o) - 2J_2(\theta_o) \cos 2\omega_o t + 2J_4(\theta_o) \cos 4\omega_o t - \ldots] - \sin \Phi [2J_1(\theta_o) \cos \omega_o t - 2J_3(\theta_o) \cdot \cos 3 \omega_o t + \ldots]\}$$

$J_o, J_1 \ldots$ are Bessel Functions.

The circuit of FIG. 4 is used to find the phase angle $\Phi$. Lock-in amplifiers 50 and 52 are used to find the amplitudes of the fundamental and first harmonic components of the signal. The amplitudes follow the relationship:

$$S_1 = A \sin \Phi J_1(\theta_o)$$

$$S_2 = A \cos \Phi J_2(\theta_o)$$

and the phase angle is given by:

$$\tan \phi = \frac{S_1}{S_2} \cdot \frac{J_2(\theta_o)}{J_1(\theta_o)}$$

The optical path difference (OPD) is given by:

$$\phi = \frac{2\pi}{\lambda} OPD$$

With modulator 14 operating with a 50 kHz modulation frequency supplied by signal generator 15 (FIG. 1) and the output of each detector amplifier being fed into lock-in amplifiers 50 and 52 and recording the modulated signal at f(50 kHz) and 2f(100 kHz) in multichannel recorder 54, the ratio of the f to 2f signal is obtained by divider circuit 56 and is proportional to the tangent of the phase of the mirror surface.

Figure 6:
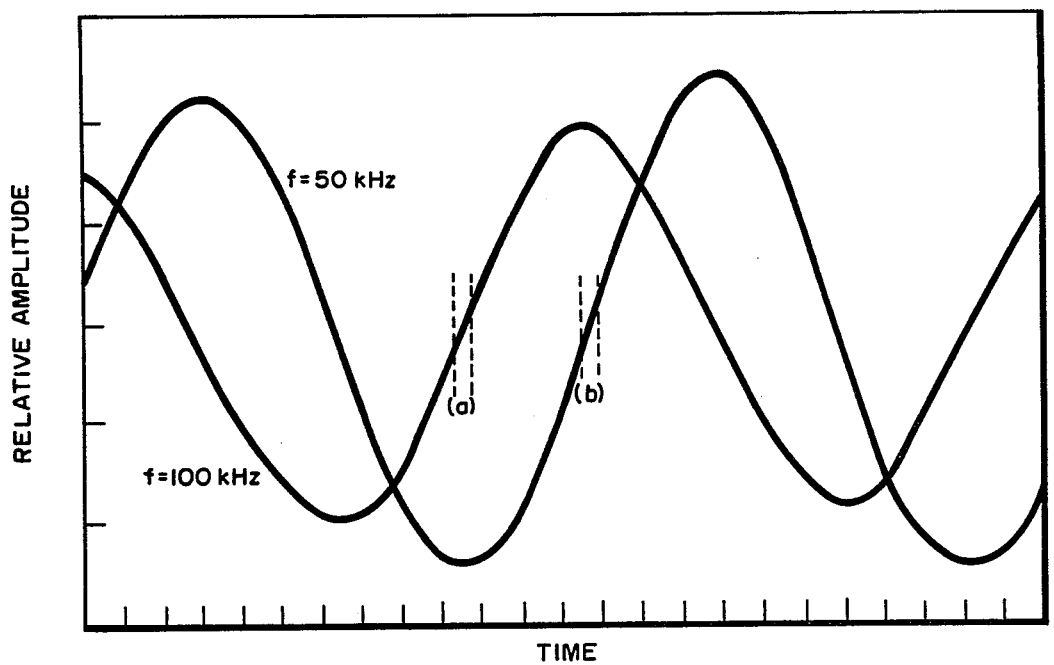
FIG. 6 shows the fundamental (50 kHz) and first harmonic (100 kHz) components as the detector illustrated in FIG. 1 is translated across the interference plane, with the mirror slightly tilted to produce linear fringes.

FIG. 6 shows the f and 2f outputs as the detectors 30 and 32 are translated across the interference plane by means of the motorized mounting stage.

Figure 7:
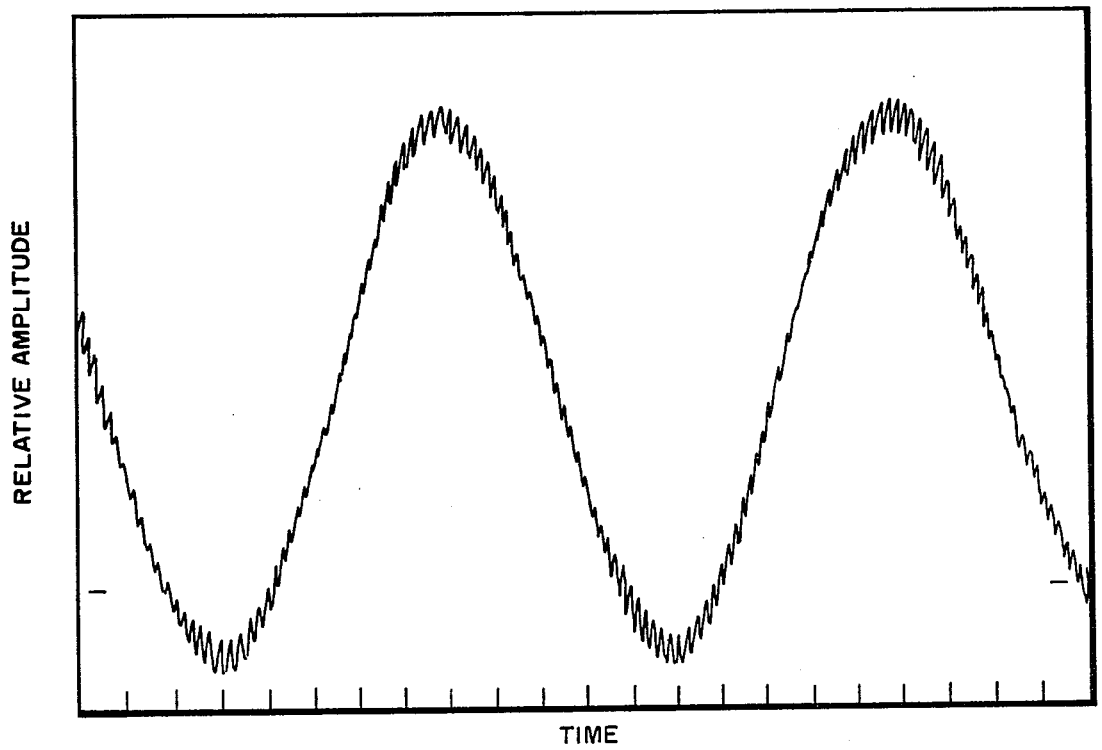
FIG. 7 shows a fundamental component amplitude as the interference plane is scanned over the region (a) in FIG. 6.

FIG. 7 shows a recording of the frequency component when the interferometer is repeatively scanned over a small area of the mirror 18 shown as region (a) in FIG. 6. The total phase variation across this region is $\lambda/30$ so that the recording shows a sinusoidal output as the detector is scanned back and forth. In the recording of FIG. 7, the gain of the lock-in amplifiers was increased 10 times higher than the gain for the recording of FIG. 6. The increase in gain was to provide for better resolution. The peak-to-peak noise level is about $\lambda/600$ peak at bandwidth of 1 kHz with the peak-to-peak noise level on the order of 5% of the amplitude.

By increasing the time constant to 100 milliseconds, a noise level of less than $2 \times 10^{-4} \lambda$ peak-to-peak, at a measurement bandwidth of 10 Hz was achieved.

Figure 5:
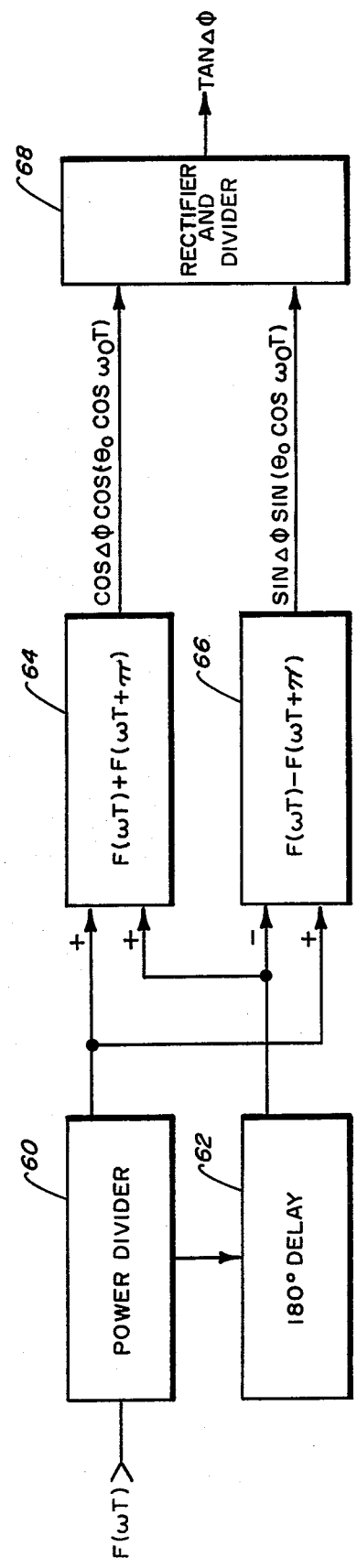
FIG. 5 is a signal processing circuit using a 180° delay to obtain the optical phase ($\Phi$) from the detector output signal of FIG. 1.

A second circuit for signal processing by filtering out the odd and even harmonics is shown in FIG. 5. It can be shown that for a periodic signal f($\omega t$), which can be represented by its spectral components as:

$$f(\omega t) = \sum_{n=-\infty}^{\infty} a_n \cos(n\omega t)$$

The following relationship holds $$f(\omega t) + f(\omega t + \pi) = \sum_{k=-\infty}^{\infty} a_{2k} \cos(2k\omega t)$$

$$f(\omega t) - f(\omega t + \pi) = \sum_{k=-\infty}^{\infty} a_{2k+1} \cos[(2k+1)\omega t]$$

in other words, by delaying a periodic signal for half a period and then interferring it (subtracting or adding) with the original signal, the odd or even harmonics can be filtered out.

The output signal F($\omega t$) is fed to power divider 60 where the signal is divided and fed directly and through a 180° delay circuit 62 to add circuit 64 and a subtract circuit 66. Rectifier and divider circuit 68 rectifies the sum and difference signals and divides the DC levels of the two rectified signals.

A third method of employing this interferometer is by introducing a phase compensator in the optical train, before the polarizing prism 16. The interferometer works as a null-detector and the phase is determined by reading the position of the compensator. The compensator can be a polarizer or a waveplate. Very accurate phase compensation can be achieved by tilting a waveplate. The phase retardation follows the equation:

$$\frac{\Delta\lambda}{\lambda} = \frac{\theta^2}{2\pi^2}$$

where $\theta$ is the tilt angle and ($\Delta\lambda/\lambda$) is proportional to the phase introduced. The null detection is achieved by nulling the amplitude of the fundamental or first harmonic components of the signal, as detected by a phase lock-in amplifier or an equivalent instrument.

Obviously many modifications and variations of the present invention are possible in the light of the above teachings. It is therefore to be understood that within the scope of the appended claims the invention may be practiced otherwise than as specifically described.

We claim:

1. Interferometer for measuring the optical path differences representing the surface contour of optical surfaces comprising:
   means for producing a beam of polarized radiation,
   means for modulating the relative phase of the two polarization states of the optical field of said beam,
   means for splitting said modulated beam into two orthogonal components and directing one of the beams onto said optical surface where it is reflected, means for recombining said two components to produce a single beam, detector means disposed in a plane perpendicular to the optical path of the single beam for detecting the interference intensity, circuit means connected to said detector means for providing an output signal proportional to the optical path difference between the two components of the beam, said circuit means including lock-in amplifier means for providing a first and second signal proportional to the amplitudes of the fundamental and first harmonic components of the detected signal and an output signal that is the ratio of said first and second signals.

2. Interferometer for measuring the optical path differences representing the surface contour of optical surfaces comprising:

means for producing a beam of polarized radiation, means for modulating the relative phase of the two polarization states of the optical field of said beam, means for splitting said modulated beam into two orthogonal components and directing one of the beams onto said optical surface where it is reflected, means for recombining said two components to produce a single beam, detector means disposed in a plane perpendicular to the optical path of the single beam for detecting the interference intensity, circuit means connected to said detector means for providing an output signal proportional to the optical path difference between the two components of the beam, said circuit means including a power divider having an input connected to said detector means and having first and second outputs, a delay circuit having an input connected to the first output of said power divider and having an output, a summing circuit having a first input connected to the second output of said power divider, a second input connected to the output of said delay circuit and having an output, a subtracting circuit having a first input connected to the output of said delay circuit, a second input connected to the second output of said power divider and having an output, and a rectifier and division circuit having a first input connected to the output of said summing circuit, a second input connected to the output of said subtracting circuit, wherein said detected signal is fed directly and through said delay circuit to said summing circuit and said subtracting circuit and provides an output signal that is the ratio between the output signals of said summing and subtracting circuits.

3. Interferometer for measuring the optical path differences representing the surface contour of optical surfaces comprising:

photoelastic modulator means for producing a beam of polarized radiation, means for modulating the relative phase of the two polarization states of the optical field of said beam, means for splitting said modulated beam into two orthogonal components and directing one of the beams onto said optical surface where it is reflected, means for recombining said two components to produce a single beam, detector means disposed in a plane perpendicular to the optical path of the single beam for detecting the interference intensity, circuit means connected to said detector means for providing an output signal proportional to the optical path difference between the two components of the beam, said circuit means including lock-in amplifier means for providing a first and second signal proportional to the amplitudes of the fundamental and first harmonic components of the detected signal and an output signal that is the ratio of said first and second signals.

* * * * *